United States Patent
Hayashi et al.

(10) Patent No.: US 7,124,561 B2
(45) Date of Patent: Oct. 24, 2006

(54) TAPE GUIDE DEVICE FOR GARDENING BUNCHER

(75) Inventors: Susumu Hayashi, Tokyo (JP); Makito Fukada, Tokyo (JP); Hitoshi Matsumoto, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 10/482,780

(22) PCT Filed: Jul. 3, 2002

(86) PCT No.: PCT/JP02/06745

§ 371 (c)(1),
(2), (4) Date: Aug. 3, 2004

(87) PCT Pub. No.: WO03/004358

PCT Pub. Date: Jan. 16, 2003

(65) Prior Publication Data

US 2005/0028497 A1   Feb. 10, 2005

(30) Foreign Application Priority Data

Jul. 5, 2001   (JP) ............... 2001-205373
Mar. 20, 2002  (JP) ............... 2002-077617
Jun. 13, 2002  (JP) ............... 2002-173115

(51) Int. Cl.
*B65B 27/00*   (2006.01)
*B65B 13/02*   (2006.01)

(52) U.S. Cl. ............. 53/592; 53/138.2; 53/138.6; 227/140

(58) Field of Classification Search .... 53/138.1–138.4, 53/138.6, 139.4, 580, 582, 586, 592; 227/140; B65B 27/00

See application file for complete search history.

(56) References Cited

U.S. PATENT DOCUMENTS

| 3,093,943 A * | 6/1963 | Kazimir ............... 53/592 |
| 6,050,471 A * | 4/2000 | Yagi .................. 227/119 |
| 6,382,289 B1 * | 5/2002 | Jho ................... 156/468 |
| 6,968,988 B1 * | 11/2005 | Hayashi et al. ........ 227/76 |

FOREIGN PATENT DOCUMENTS

| EP | 0568485 A * | 11/1993 |
| JP | 49-83180 U | 7/1974 |
| JP | 54-146691 U | 10/1979 |
| JP | 01213112 A * | 8/1989 |
| JP | 1-132501 U | 9/1989 |
| JP | 07223611 A * | 8/1995 |
| JP | 2001-055203 | 2/2001 |

* cited by examiner

*Primary Examiner*—Stephen F. Gerrity
(74) *Attorney, Agent, or Firm*—Morgan, Lewis & Bockius LLP

(57) ABSTRACT

A rib (206c) is formed on a ceiling surface of a tape guide mounted on a driver handle of a binding machine for gardening, and two plate springs (224a, 224b) are mounted on the bottom plate portion of the tape guide. The plate spring (224a), which is situated on the downstream side, is elastically contacted with the rib (206c) to thereby allow the plate spring (224a) and rib (206c) to hold tape (T) between them, while the upstream-side plate spring (224b) is contacted with the tape. When a tape roll is rotated reversely and the tape is thereby pulled back, tension is applied to the tape existing between the rib (206c) and tape roll, and the upstream-side plate spring (224b) is raised up due to the friction of the tape to curve a passage of the tape, which increases the frictional resistance of the tape to thereby be able to prevent the tape (T) against reverse movement.

5 Claims, 20 Drawing Sheets

TAPE GUIDE DEVICE FOR GARDENING BUNCHER

FIELD OF THE INVENTION

The present invention relates to a tape guide apparatus in a binding machine for gardening and, in particular, to a tape guide apparatus in a binding machine for gardening which can prevent tape against reverse movement.

BACKGROUND ART

In the cultivation of creeping plants such as a grape, a cucumber, a melon and a tomato, in an operation to bind the vines or branches of these creeping plants along support posts or trellises, there is used a binding machine for gardening. The binding machine for gardening is a tool of a hand-held stapler type which is a combination of a driver handle and a clincher arm, while a tape magazine is mounted on the rear portion of the driver handle. To use the binding machine for gardening, tape loaded into the tape magazine is pulled out from a tape pull-out opening formed in the leading end portion of the driver handle.

When the driver handle and clincher arm are closed once, the leading end of the tape is caught by a tape clamp device which is disposed on the clincher arm. Then, when the driver handle and clincher arm are opened, the tape is strung between the driver handle and clincher arm. Further, when the tape is wound around the branches of the plant and posts and then the driver handle and clincher arm are closed with a stronger force than the previous time, the overlapped portion of the tape wound around the branches is bound and, at the same time, the cutter blade cuts the tape in the vicinity of the bound portion, thereby separating the tape loop wound around the branches from the tape main body.

When binding the plant, an operator uses the binding machine for gardening at various attitudes; and, due to the varying attitudes, in some cases, the tape roll existing within the tape magazine can be rotated reversely and thus the leading end of the tape can be pulled back into the driver handle. In this case, there is a possibility that the tape grip device on the clincher arm side cannot catch the leading end of the tape on the driver handle side and thus fails to bind the plant; and, the leading end of the tape must be pulled to adjust the tape pull-out amount of the tape, which takes time and labor.

In a conventional binding machine for gardening, a plate spring is disposed within the driver handle, and the tape is pushed against the wall surface of a tape passage or against a guide by the plate spring to apply pull-out tension to the tape, thereby preventing the tape from loosening. However, since the reversing preventive action is weak, the reverse movement of the tape occurs frequently. Thus, in order to prevent the reverse movement of the tape, there arise technical problems to be solved. Accordingly, it is an object of the invention to solve the above problems.

DISCLOSURE OF THE INVENTION

The present invention is proposed so as to attain the above object. That is, there is provided a tape guide apparatus in a binding machine for gardening, wherein a tape magazine is disposed on a driver handle of a stapler, tape loaded into the tape magazine is inserted through the driver handle and is pulled out from a tape pull-out opening formed in the leading end of the driver handle, the leading end portion of the tape is clamped by a tape clamp device disposed on a clincher arm, and the tape is pulled out; and also wherein, a plate spring is mounted in the interior of the driver handle so as to face forwardly, the tape is pushed against the inner wall surface of the driver handle by the plate spring to thereby apply pull-out tension to the tape, characterized in that the leading end of the plate spring is elastically contacted with the upper or lower inner wall surface of the driver handle in the vicinity of the front end of the driver handle, and the contact point of the plate spring and the tape pull-out opening are shifted up and down to curve the passage of the tape at a sharp angle to thereby prevent the tape against reverse movement.

As the apparatus to attain the above object, there may also be provided, in a binding machine for gardening of a stapler type which includes a combination of a driver handle and a clincher arm, a tape guide apparatus, wherein a cylinder-type tape guide is disposed on the driver handle and tape loaded into a tape magazine mounted on the rear portion of the driver handle is inserted into the tape guide and is then pulled out from the leading end of the tape guide, characterized in that a projecting portion is provided on the inner wall surface of the tape guide, two plate springs are arranged back and forth in series on the inner wall surface of the tape guide that is opposed to the projecting portion, the leading ends of the two plate springs are directed toward the downstream side of the passage of the tape, the plate situated on the downstream side is elastically contacted with the projecting portion to thereby allow the plate spring and projection portion to hold the tape between them, the upstream side plate spring is contacted with the tape to apply pull-back resistance to the tape, thereby preventing the tape from being moved reversely.

Further, in the present tape guide apparatus in a binding machine for gardening, preferably, the two plate springs may be formed as an integrated plate spring composed of two plate springs which are produced by cut working a single plate spring to form a U-shaped cut therein to thereby turn the single plate spring into the above two long and short plate springs, and the leading end of the upstream side plate spring may be formed so as to have an angular shape or a notch-like shape.

Moreover, as the apparatus to attain the above object, there may also be provided, in a binding machine for gardening of a stapler type which includes a combination of a driver handle and a clincher arm, a tape guide apparatus, wherein a cylinder-type tape guide is disposed on the driver handle and tape loaded into a tape magazine mounted on the rear portion of the driver handle is inserted into the tape guide and is then pulled out from the leading end of the tape guide, characterized in that two plate springs are arranged back and forth in series on the inner wall surface of the tape guide, the leading ends of the two plate springs are directed toward the downstream side of a tape passage, a projecting portion is disposed on the inner wall surface of the tape guide that is opposed to the plate spring mounting portion of the tape guide, the plate spring situated on the downstream side is elastically contacted with the projecting portion to thereby allow the plate spring and projection portion to hold the tape between them, the upstream side plate spring is contacted with the tape to apply pull-back resistance to the tape, thereby preventing the tape against reverse movement.

Further, a fixing stopper may also be mounted over the base portion and middle portion of the upstream side plate spring to thereby limit the oscillation angle of the plate spring.

Moreover, there may also be provided a tape guide apparatus in a binding machine for gardening in which two plate springs are arranged back and forth in series on the inner wall surface of the tape guide, the leading ends of the two plate springs are directed toward the downstream side of the passage of tape, two projecting portions are disposed back and forth in series on the inner wall surfaces of the tape guide that are opposed to the plate spring mounting portions of the tape guide, and the two plate springs are respectively elastically contacted with their associated projecting portions to hold the tape by and between the two pairs of plate springs and projecting portions, thereby applying pull-back resistance to the tape so as to be able to prevent the tape against reverse movement.

Further, in the present tape guide apparatus in a binding machine for gardening, preferably, the two plate springs may consist of an integrated plate spring composed of two plate springs which are produced by cut working a single plate spring to form a U-shaped cut therein to thereby turn the single plate spring into the above two long and short plate springs, and the leading end of the upstream side plate spring may be formed so as to have an angular shape or a notch-like shape.

BRIEF DESCRIPTION OF THE DRAWINGS

FIG. 14(a) is a plan view of the plate spring and FIG. 14(b) is a side view thereof.

FIG. 18(a) is a plan view of the plate spring and FIG. 18(b) is a side view thereof.

FIG. 19(a) is a plan view of the plate spring and FIG. 19(b) is a side view thereof.

Figure 1:
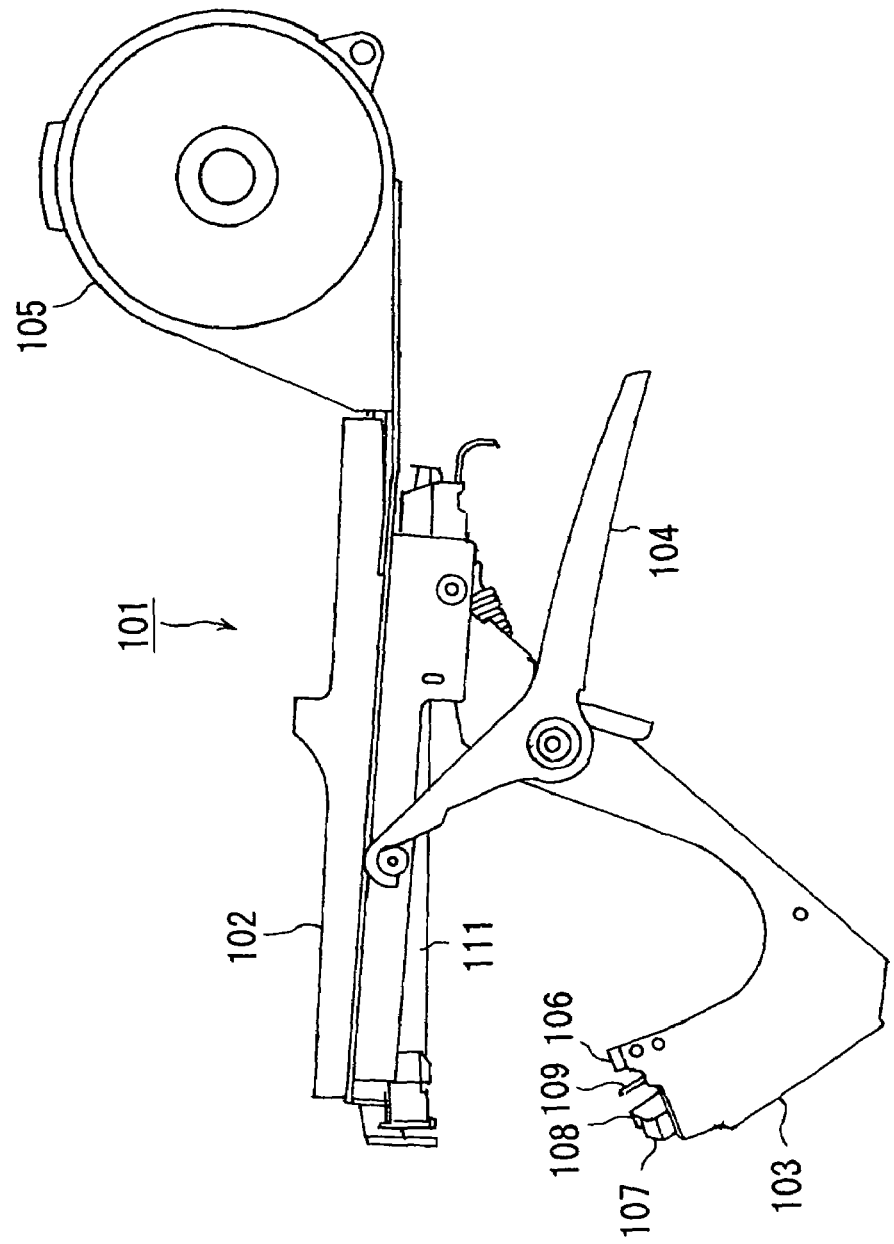
FIG. 1 is a side view of a binding machine for gardening, showing a first embodiment according to the invention.

In the drawings, reference character 101 designates a binding machine for gardening, 102 a driver handle, 103 a clincher arm, 104 a lower handle, 105 a tape magazine, 106 a clincher, 107 a picking plate, 108 a push plate, 109 a tape support plate, 110 a staple driver, 111 a staple magazine, 112 a cutter blade, 113 a handle frame, 114 a handle cover, 115 a tape pull-out opening, 116 a plate spring, 201 a binding machine for gardening, 202 a driver handle, 203 a clincher arm, 204 a lower handle, 206 a tape guide, 206c a rib, 207 a staple magazine, 210 a cutter blade, 211 a driver, 212 a clincher, 213 a picking plate, 215 a tape support plate, 224 a plate spring, 224a a long spring portion, 24b a short spring portion, and T tape, respectively.

BEST MODE FOR CARRYING OUT THE INVENTION

Now, description will be given below of a first embodiment according to the invention with reference to the accompanying drawings and, firstly, description will be given below of the whole structure and operation of a binding machine for gardening according to the first embodiment. FIG. 1 shows a binding machine for gardening 101, in which a driver handle 102, a clincher arm 103 and a lower handle 104 are combined together in a pliers type, tape for gardening is loaded into a tape magazine 105 disposed on the rear portion of the driver handle 102, and the tape is inserted through the interior of the driver handle 102 and is pulled out from the leading end portion of the driver handle 102.

Figure 2:
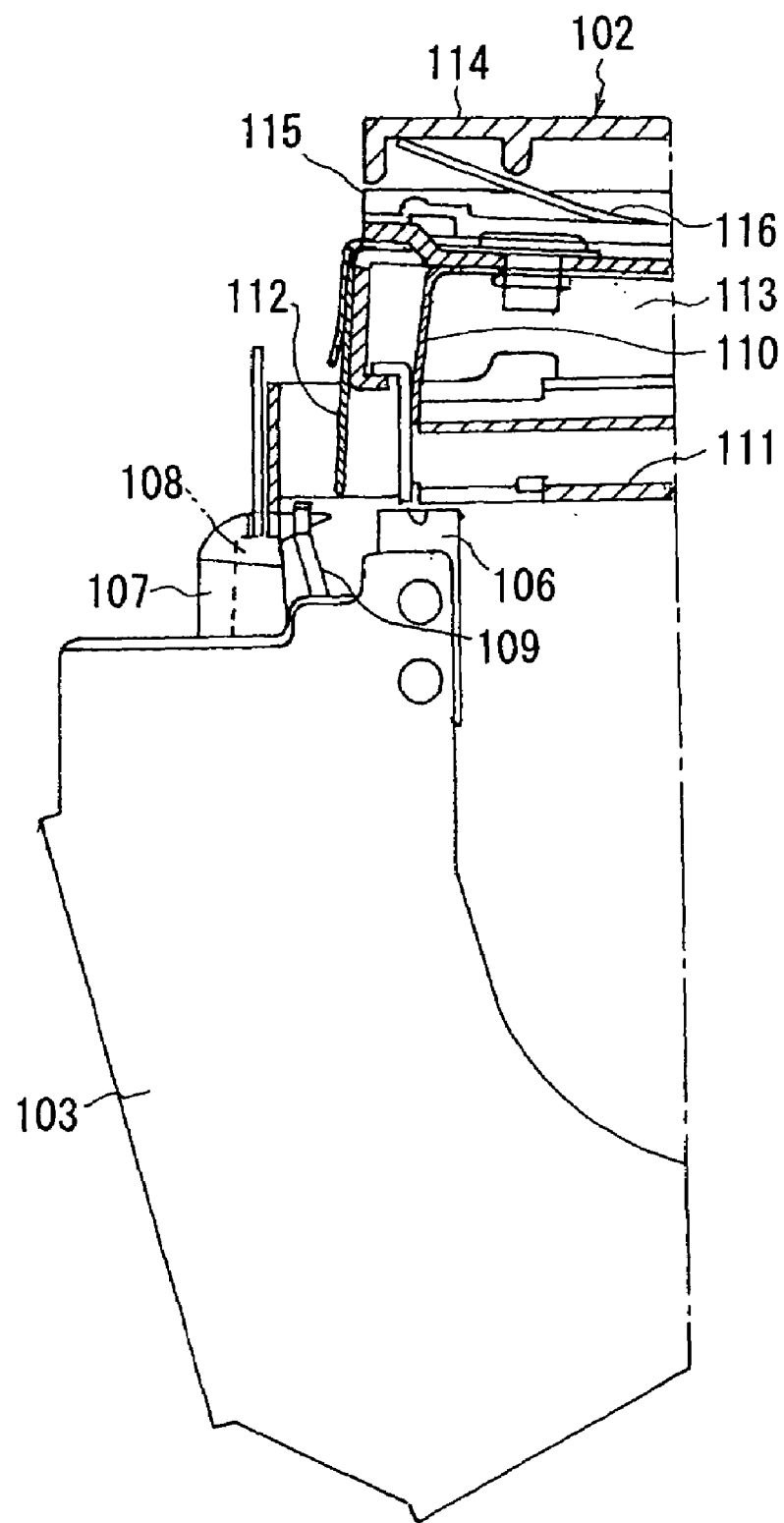
FIG. 2 is a section view of the front portion of a binding machine for gardening.

As shown in FIG. 2, a clincher 106 is mounted on the leading end portion of the clincher arm 103 and, slightly in front of the clincher 106, there is disposed a tape grip device which is a combination of a picking plate 107, a push plate 108 and a fixed cam plate (not shown) Although not shown, a pin of the picking plate 107 is engaged with a groove cam of the vertically slidable push plate 108 and with a groove cam of a fixing cam plate. When the upwardly projecting push plate 108 is pressed down, due to the cooperative operation of the groove cam of the push plate 108 and the groove cam of the fixing cam plate, the picking plate 107 is rotated toward the fore side, so that the push plate 108 is locked at the pushed position thereof. When the push plate 108 is pushed in further, the locking of the push plate 108 is removed and then, when the pushing of the push plate 108 is removed, the push plate 108 returns to its initial position and the picking plate 107 is rotated backwardly to return to its initial position.

In the binding operation, when an operator grips and closes the upper and lower handles 102, 104 together to thereby push in the push plate 108 by one stage, the picking plate 107 is rotated toward the fore side and a wedge-shaped projection provided on the leading end of the picking plate 107 is stuck to the leading end portion of the tape, so that the leading end portion of the tape is held by and between the picking plate 107 and a tape support plate 109. Further, when the handle operation is once removed to thereby open the upper and lower handles 102, 104, the leading end portion of the tape is pulled by the picking plate 107 and is thereby pulled out from the leading end portion of the driver handle 102, so that the tape is strung between the driver handle 102 and clincher arm 103. In this state, when the branches of the plant and support posts are inserted into between the driver handle 102 and clincher arm 103, the tape loop is wound around the branches and support posts (not shown).

Figure 3:
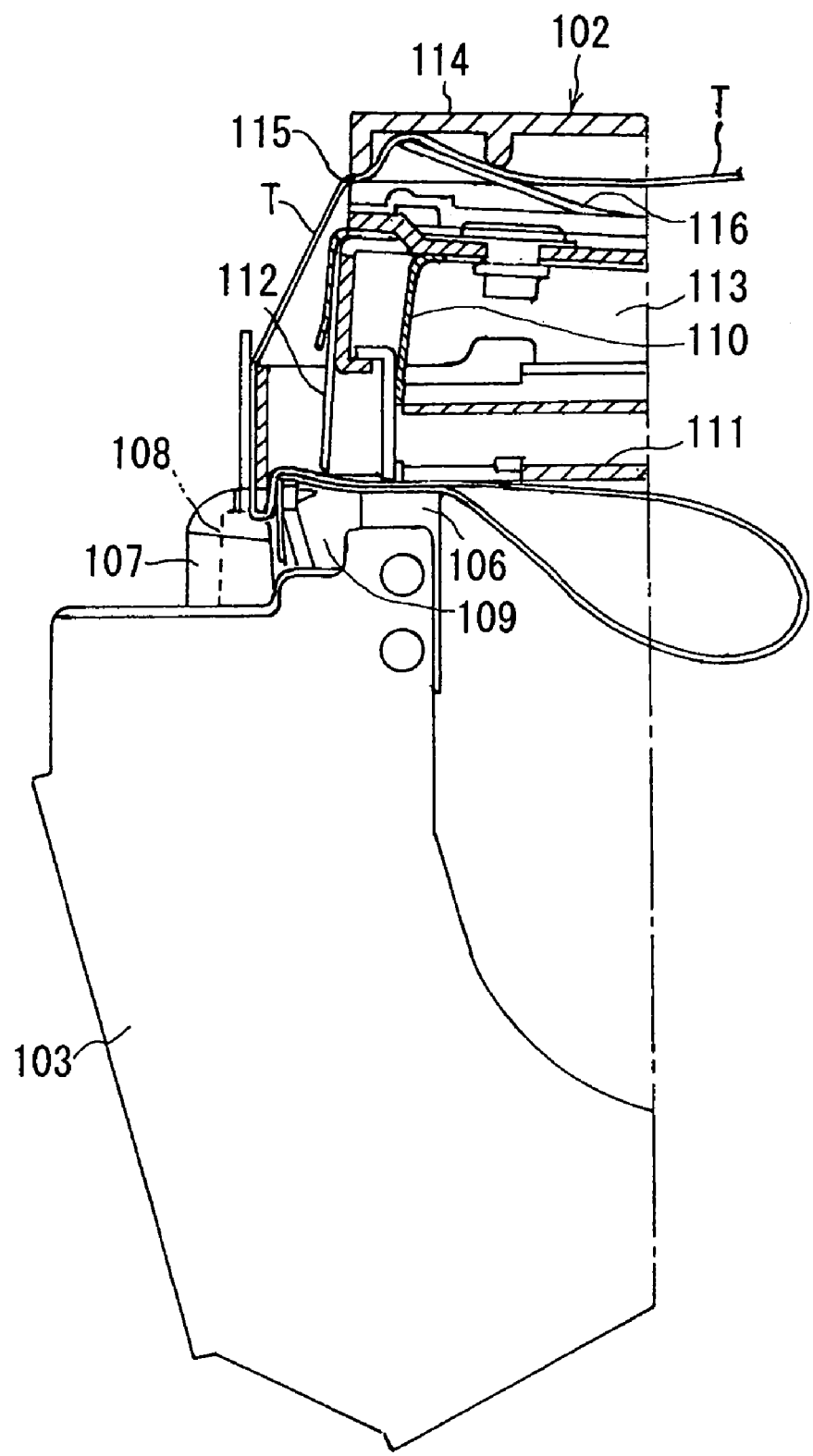
FIG. 3 is a section view of a binding machine for gardening, showing a state thereof in which a tape loop is formed.

Moreover, as shown in FIG. 3, the upper and lower handles 102, 104 are closed to thereby form the tape loop and, in this state, when the upper and lower handles 102, 104 are gripped with a stronger force, a staple driver 110 disposed on the driver handle 102 is lowered further to push out a staple (not shown) stored within a staple magazine, the staple, which has penetrated through the two end portions of tape T, is butted against the clincher 106 and is thereby bent, so that not only the tape is bound but also a jagged cutter blade 112 pushes and cuts the tape T in the vicinity of the bound portion thereof. Further, when the push plate 108 is pushed in deep, the locking of the push plate 108 is removed and the upper and lower handles 102, 104 are returned back to their respective original positions, the picking plate 107 and push plate 108 are returned back to their respective original positions shown in FIG. 1.

Figure 4:
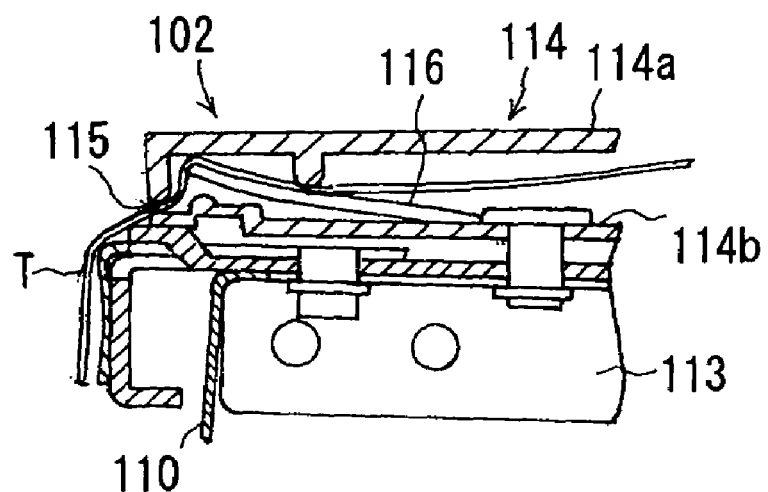
FIG. 4 is a section view of the front portion of a driver handle, showing a tape guide apparatus according to the invention.

FIG. 4 shows the front portion of the driver handle 102, in which reference character 113 designates a handle frame and 114 stands for a handle cover. The handle cover 114 is mounted on the handle frame 113; and, a clearance between the lower end of the front portion wall surface of the upper surface portion 114a of the handle cover 114 hanging down from the front end of the upper surface portion 114a and the lower surface portion 114b of the handle cover 114 provides a tape pull-out opening 115. The plate spring 116 is mounted on the lower surface portion 114b of the handle cover 114. However, alternatively, the lower surface portion 114b can be omitted and, instead, the plate spring 116 may be mounted directly on the handle frame 113 and thus the tape pull-out opening 115 may be formed between the handle cover 114 and handle frame 113.

The tip end of the plate spring 116 faces upwardly and forwardly as well as is elastically contacted with the ceiling surface of the handle cover 114 in the vicinity of the wall surface of the front portion of the handle cover 114. The tape T is pressed against the ceiling surface of the handle cover 114 by the leading end of the plate spring 116 and is then pulled out through the tape pull-out opening 115. Since the tip end of the plate spring 116 is elastically contacted with the ceiling surface of the handle cover 114 in the vicinity of the front end portion of the handle cover 114, the tape T is curved at a sharp angle with the leading end of the plate spring 116 as the boundary and is pulled out from the tape pull-out opening 115.

Figure 5:
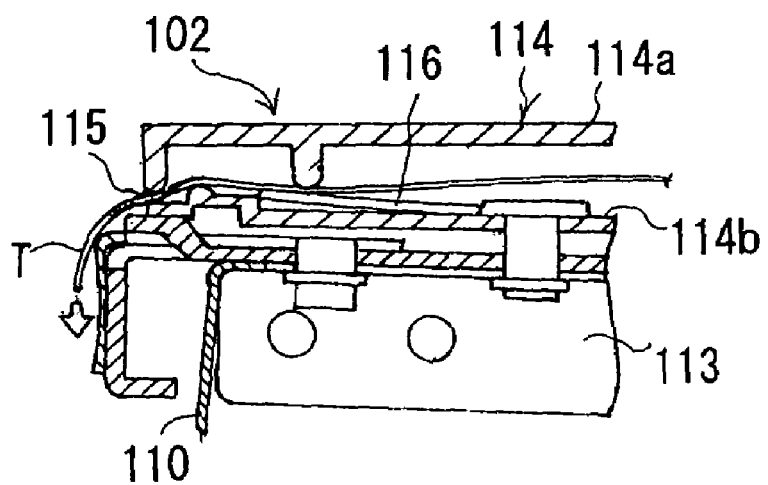
FIG. 5 is a section view of the front portion of the driver handle when a tape is pulled out.

FIG. 5 shows the state of the driver handle 102 when the tape T is pulled out, in which the plate spring 116 is pushed down due to the tension of the tape T and the tape T is thereby pulled out from the tape pull-out opening 115. On the other hand, when, due to vibrations or due to change in the attitude of the binding machine for gardening, the tape roll within the tape magazine 105 is reversely rotated and thus the tape T is thereby pulled in the opposite direction, since the leading end portion of the tape T is curved downwardly at a sharp angle in and from the leading end of the plate spring 116 and is moved toward the tape pull-out opening 115, there is applied a force which allows the tape T to pull the plate spring 116 upwardly, so that the tip end of the plate spring 116 presses the tape T against the ceiling surface of the handle cover 114. Also, the pressure of the plate spring 116 increases as the pull-back tension of the tape T increases, thereby being able to prevent the tape T against reverse movement.

Figure 6:
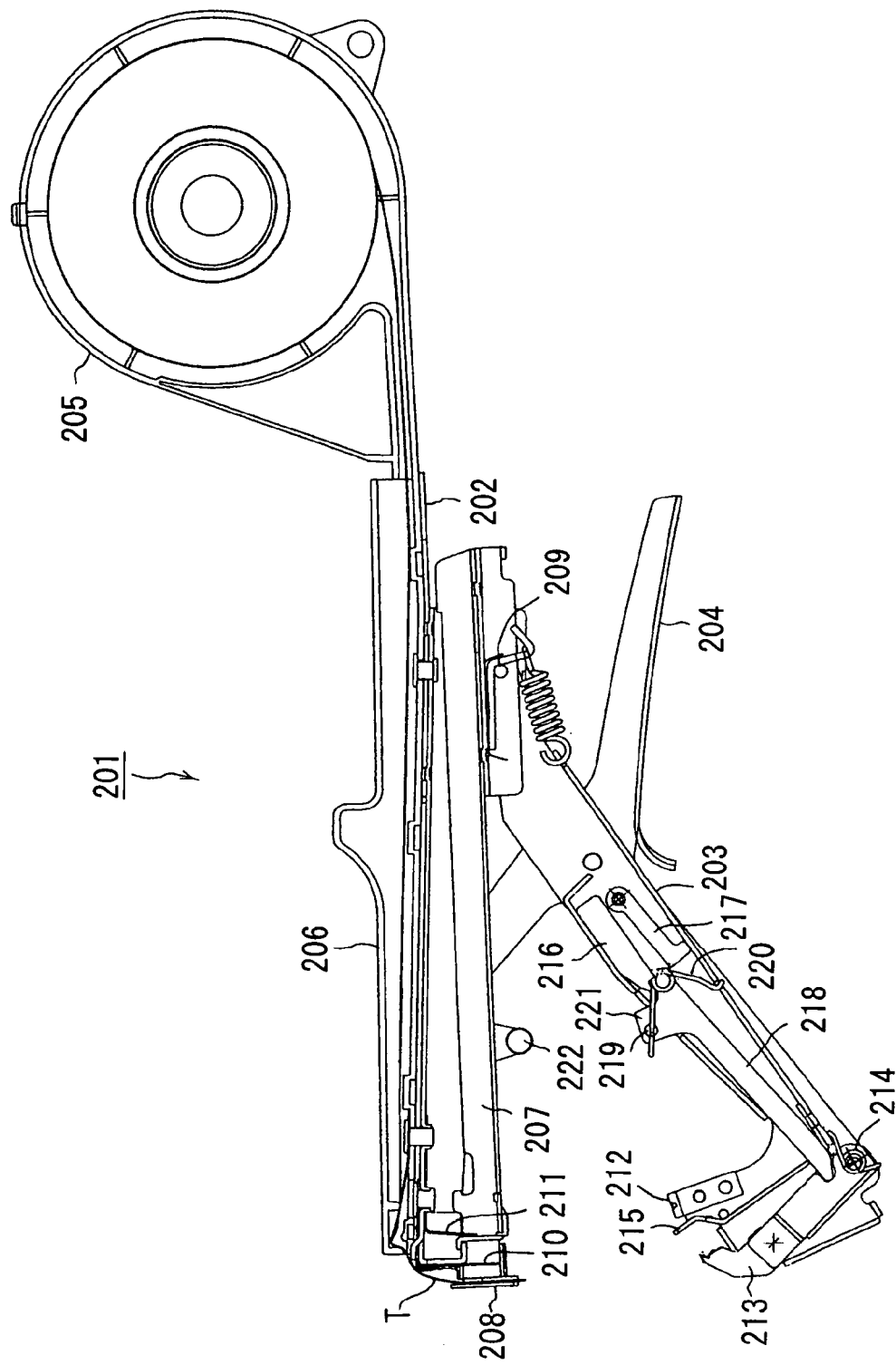
FIG. 6 is a side view of a binding machine for gardening, showing a second embodiment according to the invention.

Next, description will be given below in detail of a second embodiment according to the invention with reference to the accompanying drawings and, firstly, description will be given below of the whole structure and operation of a binding machine for gardening according to the second embodiment. FIG. 6 shows a binding machine for gardening 201, in which a driver handle 202, a clincher arm 203 and a lower handle 204 are combined together in a pliers type, a tape magazine 205 is mounted on the rear portion of the driver handle 202, tape T for gardening loaded into the tape magazine 205 is inserted through a tape guide 206 mounted on the upper surface of the driver handle 202 and is pulled out from the leading end of the tape guide 206, and the tape T is then inserted through a vertical tape guide 208 provided on the leading end of a staple magazine and is hung downwardly. The driver handle 202 and staple magazine 207 are connected together by a shaft 209 disposed on the rear portion of the staple magazine 207; and, similarly to an ordinary stapler, the staple magazine 207 can be rotated with respect to the driver handle 202 in a slight angle range. A notch-blade-shaped cutter blade 210 is mounted on the leading end of the driver handle 202 and, slightly backwardly of the cutter blade 210, there is mounted a plate-shaped driver 211 which is used to eject the staple.

Figure 7:
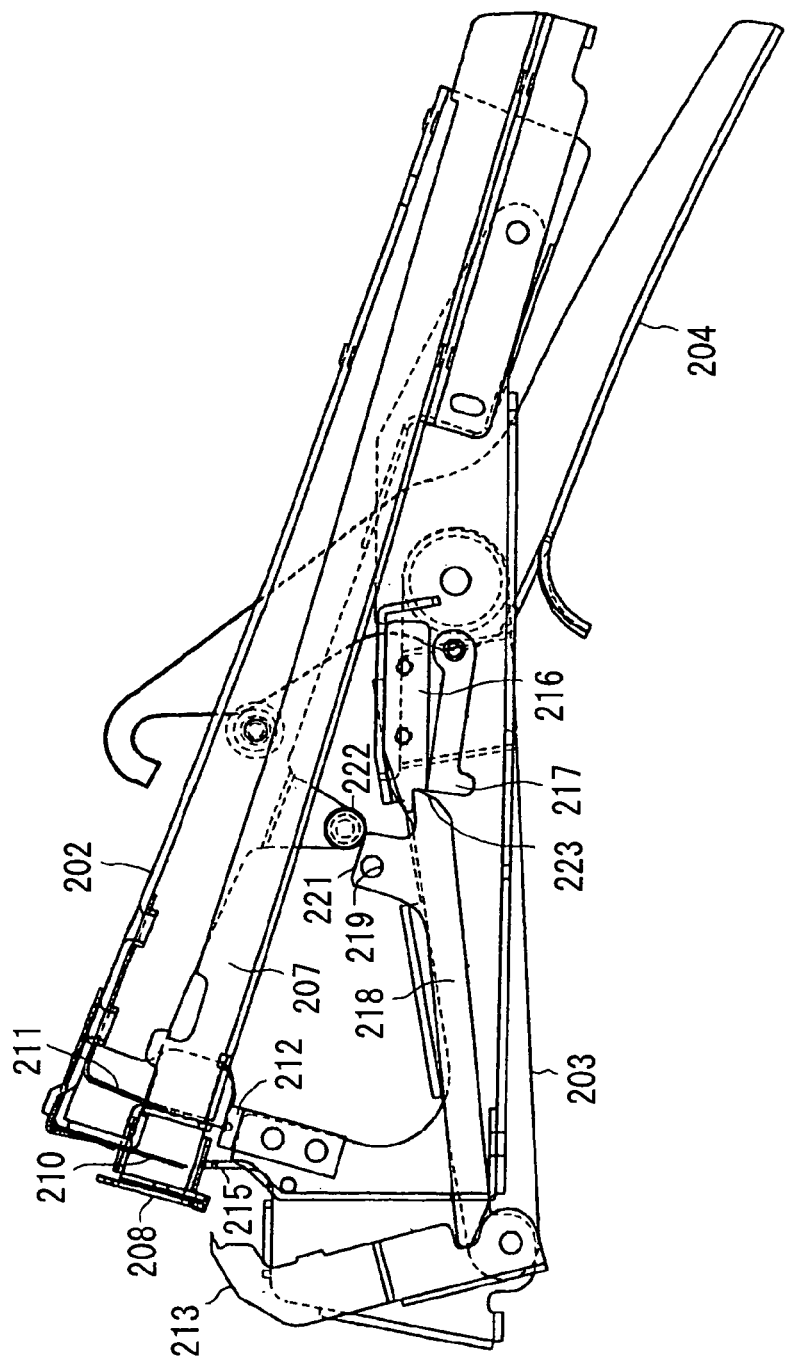
FIG. 7 is a side section view of a binding machine for gardening, showing its operation process.

Next, description will be given below of the structure of the clincher arm 203 side. FIG. 7 shows a state in which, with the tape magazine 205 and tape guide 206 omitted, the driver handle 202 and lower handle 204 are gripped by the operator and the driver handle 202 and clincher arm. 203 are thereby closed lightly. In this state, a clincher 212 disposed in the leading end portion of the clincher arm 203 is contacted with the leading end portion of the staple magazine 207, while the clincher 212 is disposed opposed to a driver 211.

A picking plate 213, which is mounted on the front portion of the clincher arm 203 and can be rotated back and forth, is energized toward the pivot shaft side (in FIG. 7, toward the right) of the binding machine 201 for gardening by a torsion coil spring 214 shown in FIG. 6 and, as shown in FIG. 7, the picking plate 213 is opposed to a tape support plate 215 which is disposed on the fore side of the picking plate 213. A stopper 216 is fixed to the vicinity of the base portion of the clincher arm 203; and, a clutch lever 217, which can be rotated up and down, is mounted on the bottom surface of the stopper 216. Between the picking plate 213 and stopper 216, there is inserted a push plate 218 which is long in the longitudinal direction thereof; and, as shown in FIG. 6, the push plate 218 is energized in the rising direction by a twist coil spring 220 interposed between a spring receive hole 219 formed in the rear portion of the push plate 218 and the bottom surface of the clincher arm 203.

As shown in FIG. 7, the front end portion of the push plate 218 is engaged with the recessed portion of the front surface of the picking plate 213, while the push plate 218 is pressed by the picking plate 213 so that the rear end of the push plate 218 is pressure contacted with the front surface of the stopper 216. In the rear portion of the push plate 218, there is formed a projecting portion 221 which rises upwardly; and, in a state where the clincher 212 is contacted with the staple magazine 207, the projecting portion 221 is moved nearer to or is contacted with a roller 222 which is disposed on the driver handle 202.

Figure 8:
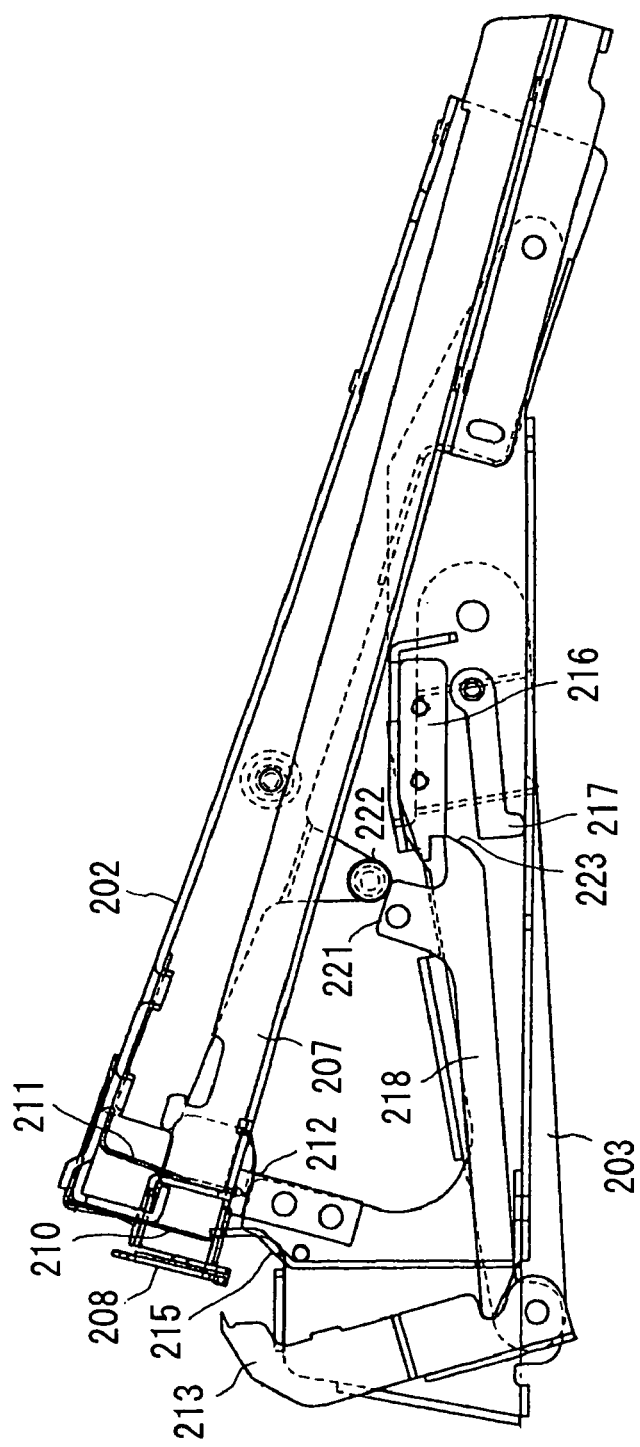
FIG. 8 is a side section view of a binding machine for gardening, showing its operation process.
Figure 9:
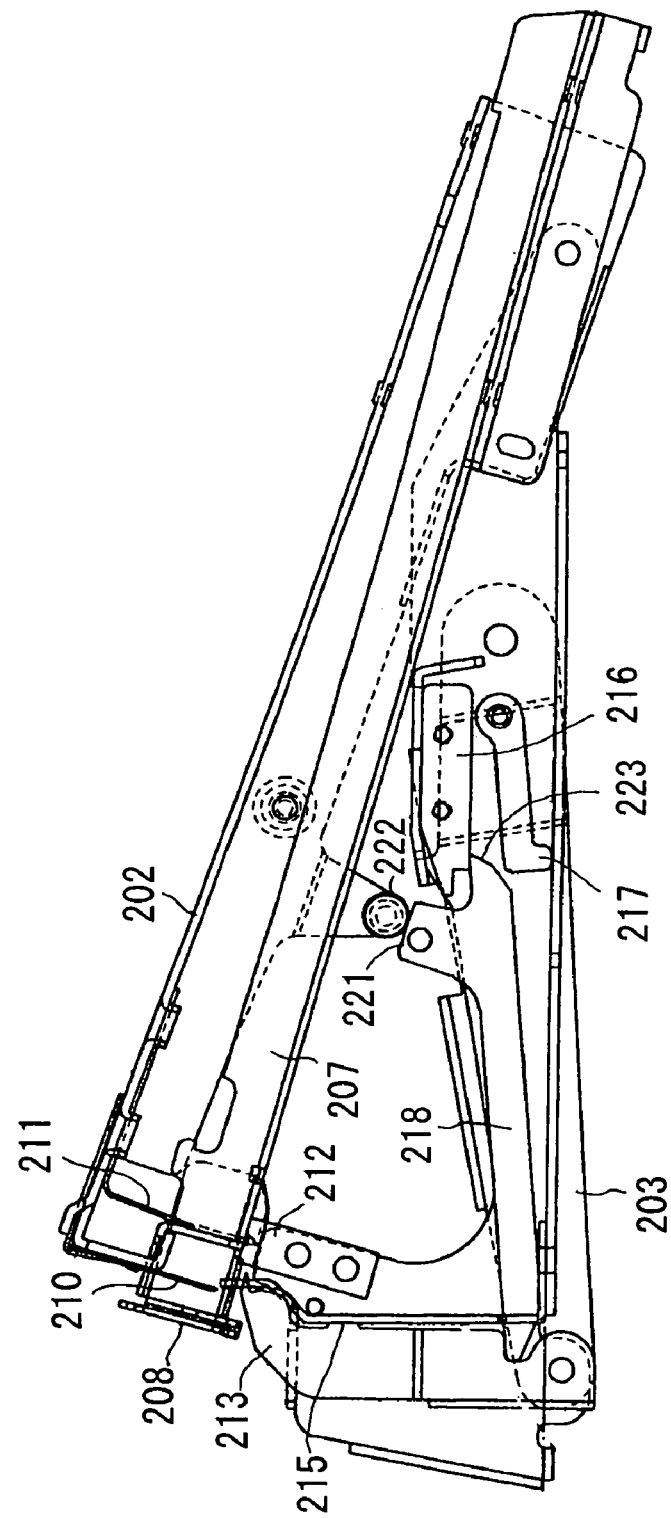
FIG. 9 is a side section view of a binding machine for gardening, showing its operation process.

When the driver handle 202 and clincher arm 203 are closed further from the state shown in FIG. 7, as shown in FIG. 8, the push plate 218 is pushed by the roller 222 and is thereby moved down and, as shown in FIG. 9, the engagement between the push plate 218 and stopper 216 is removed, so that the push plate 218 is pushed by the picking plate 213 and is thereby moved back. The picking plate 213 is rotated toward the tape support plate 215 to stick into the leading end portion of tape (not shown) hanging down from the vertical tape guide 208 disposed on the front surface of the staple magazine 207, and is contacted with the tape support plate 215 to thereby hold the leading end of the tape. When, from this state, the closing operation of the driver handle 202 and lower handle 204 is removed to open the driver handle 202 and clincher arm 203, the tape is pulled from the driver handle 202 side and is strung between the driver handle 202 and clincher arm 203. Then, when the binding machine 201 for gardening is pushed out forwardly to insert the branches of the plant and support posts into a space between the driver handle 202 and clincher arm 203, the tape can be wound around the branches and support posts.

Figure 10:
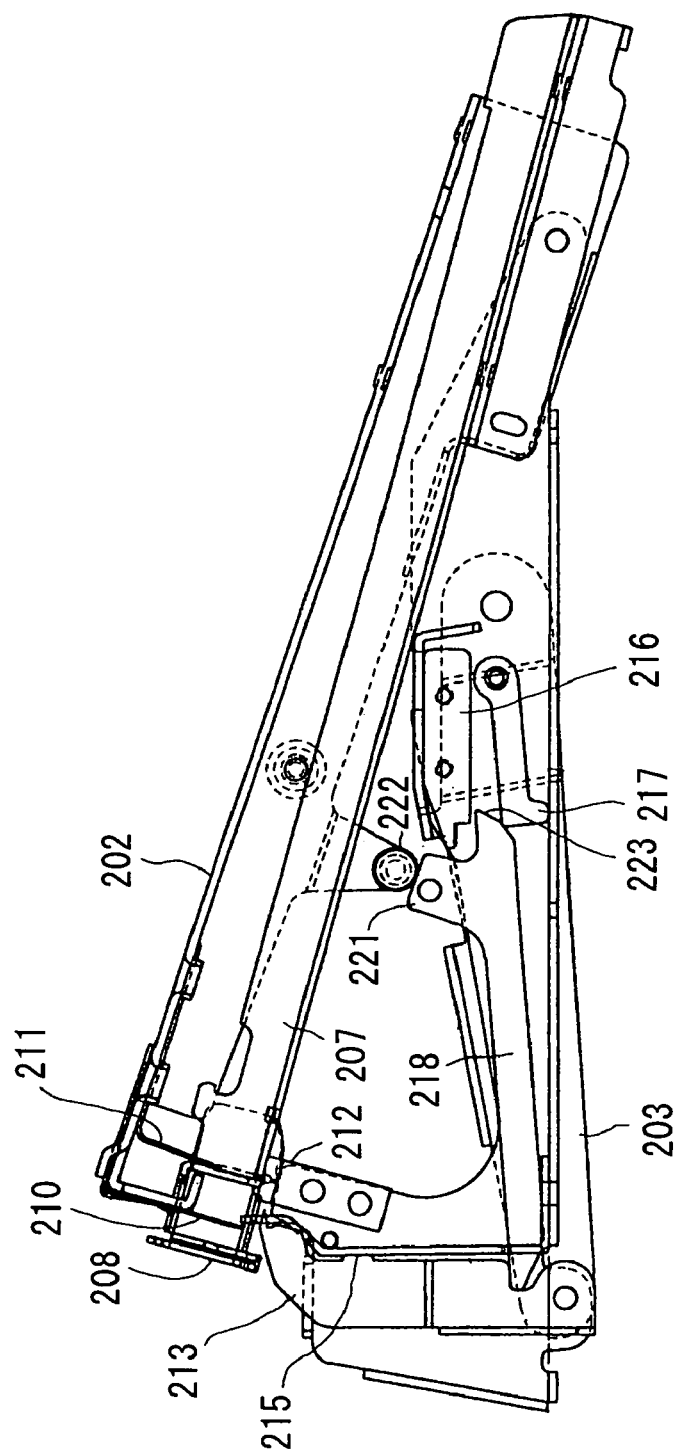
FIG. 10 is a side section view of a binding machine for gardening, showing its operation process.
Figure 11:
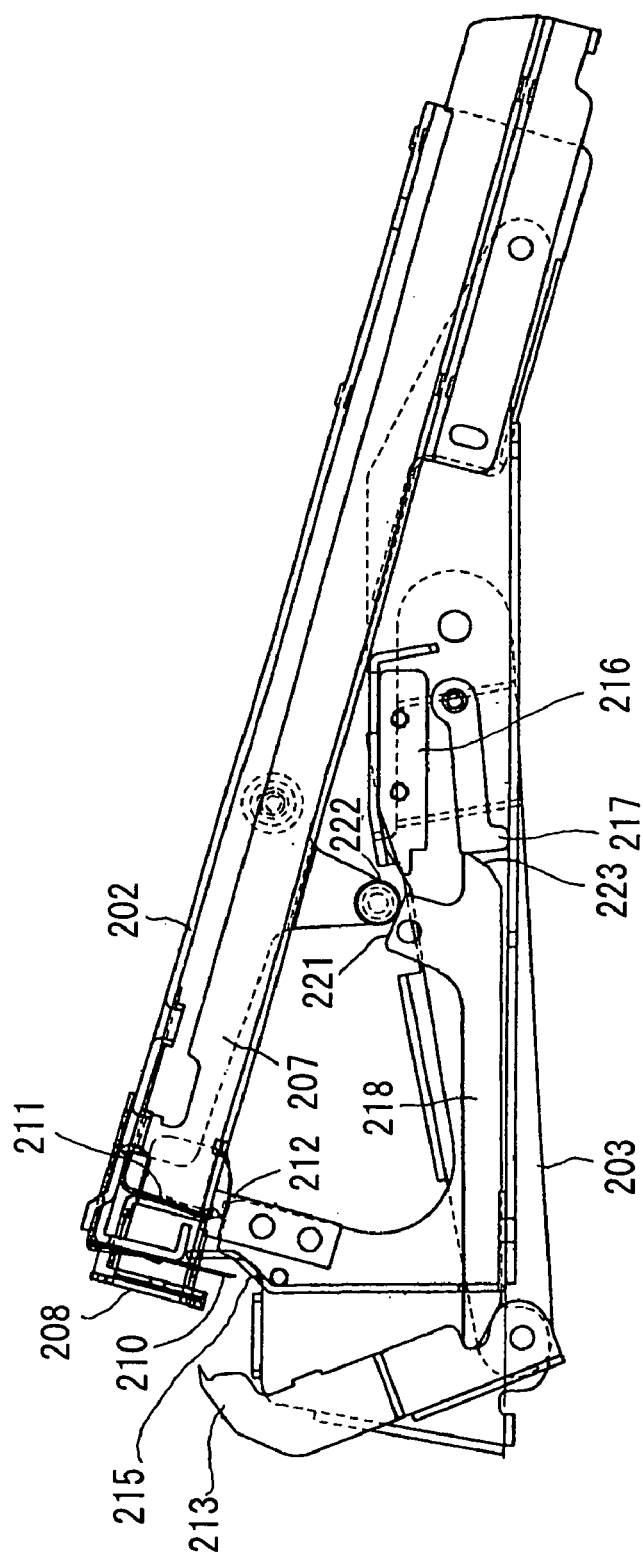
FIG. 11 is a side section view of a binding machine for gardening, showing its operation process.
Figure 12:
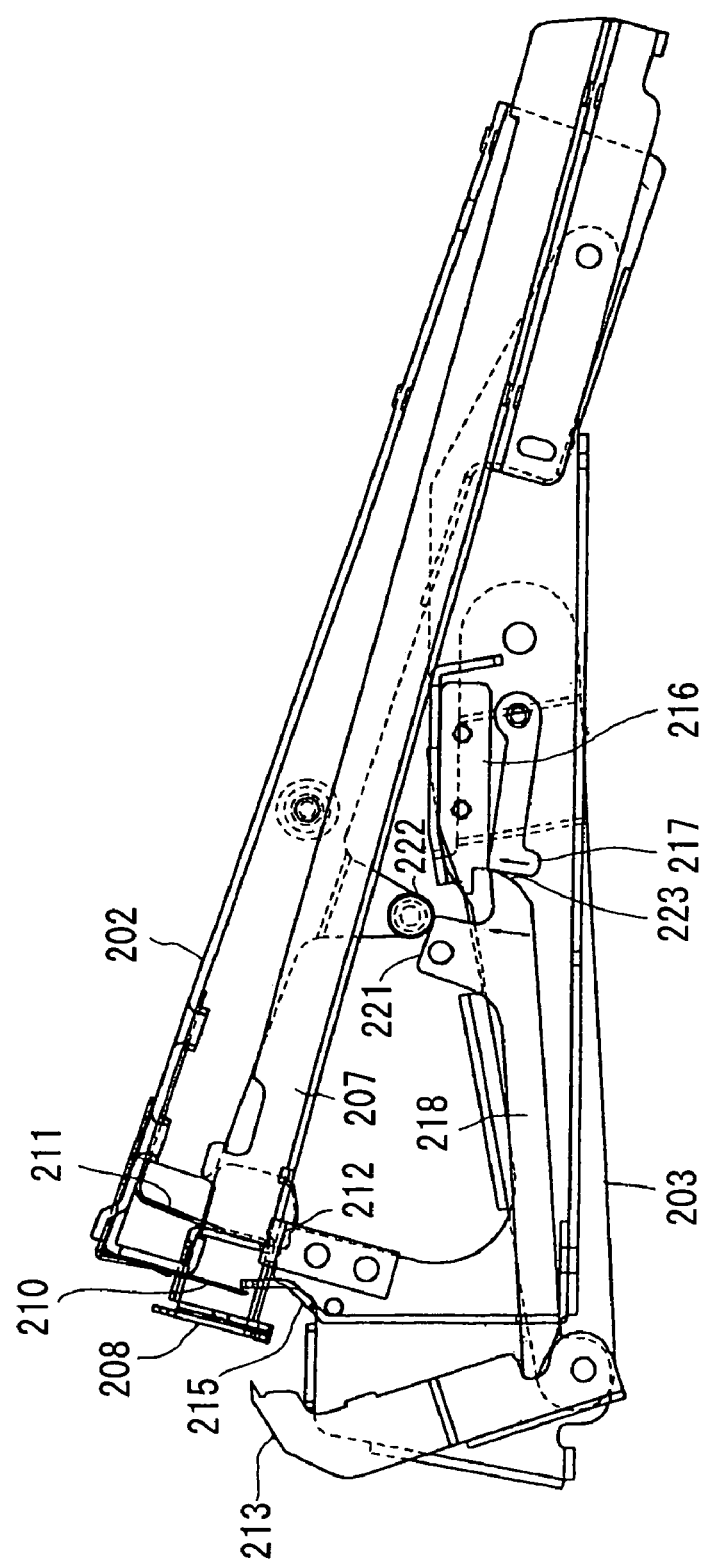
FIG. 12 is a side section view of a binding machine for gardening, showing its operation process.

Next, when the driver handle 202 and clincher arm 203 are closed to thereby provide a state shown in FIG. 9, the leading end portion of the tape (not shown) gripped by the tape support plate 215 is overlapped on the downstream portion of the tape in the vicinity of the exit of the tape guide 208 to thereby form a tape loop. Then, when a clearance between the driver handle 202 and clincher arm 203 is narrowed further, as shown in FIG. 10, the driver 211 is butted against a staple within the staple magazine 207 to start ejecting the staple, while the cutter blade 210 is contacted with the tape in the vicinity of the upper edge of the front surface of the tape support plate 215. At the same time, the inclined cam surface 223 of the lower surface of the rear portion of the push plate 218 is butted against the clutch lever 217 and, due to the cam action of the inclined cam surface 223, the push plate 218 starts advancing in linking with the lowering motion of the driver handle 202. Further, as shown in FIG. 11, when the driver 211 ejects the staple to bind the tape and the cutter blade 210 cuts the tape, the picking plate 213 is rotated forwardly and is retreated from the passage of the cutter blade 210, and the rear end of the push plate 218 is moved up onto the front surface of the clutch lever 217. After completion of the binding operation, when the driver handle 202 and clincher arm 203 are opened, as shown in FIG. 12, the push plate 218, which has been released from the pressure by the roller 222, is raised together with clutch lever 217 by the twist coil spring 220 and the rear end of the push plate 218 is engaged with the stopper 216, which returns the binding machine for gardening to the initial state shown in FIG. 7.

Figure 13:
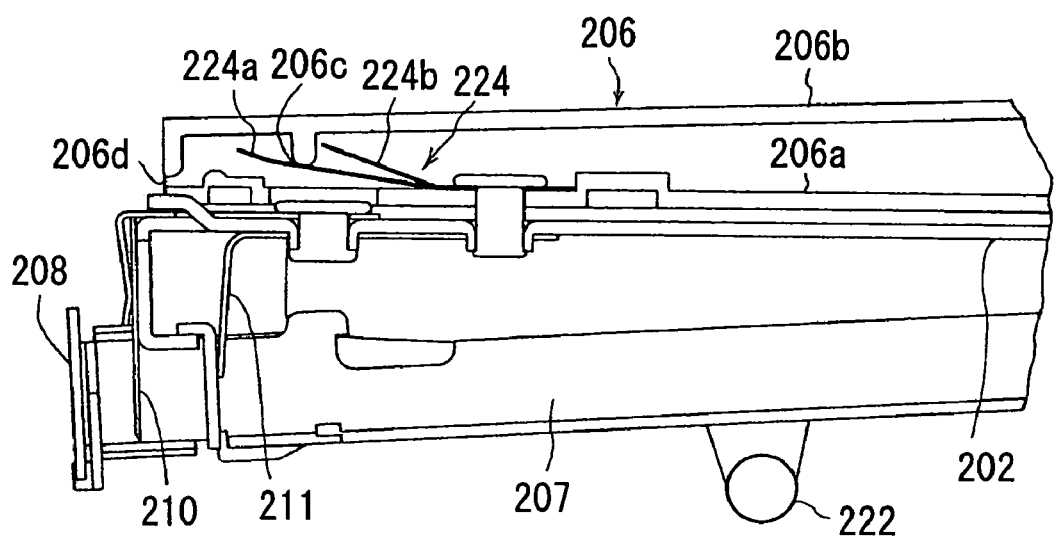
FIG. 13 is a side section view of the front portion of the driver handle.

Next, description will be given below of a tape guide apparatus according to a second embodiment of the invention. FIG. 13 shows the front portion of a driver handle 202. A cylinder-shaped resin-made tape guide 206, which is mounted on the upper surface of the driver handle 202, is an integral molding which is composed of a bottom plate portion 206a and an upper cover portion 206b connected together by a thin hinge portion, while the upper cover portion 206b can be opened and closed. On the front portion of the upper cover portion 206b, there is disposed a rib 206c which hangs down from the ceiling surface of the upper cover portion 206b; and, the tape is moved between the rib 206c and a plate spring 224 mounted on the bottom plate portion 206a and is pulled out from a lower end opening 206d formed in the wall surface of the front portion of the tape guide 206.

Figure 14A:
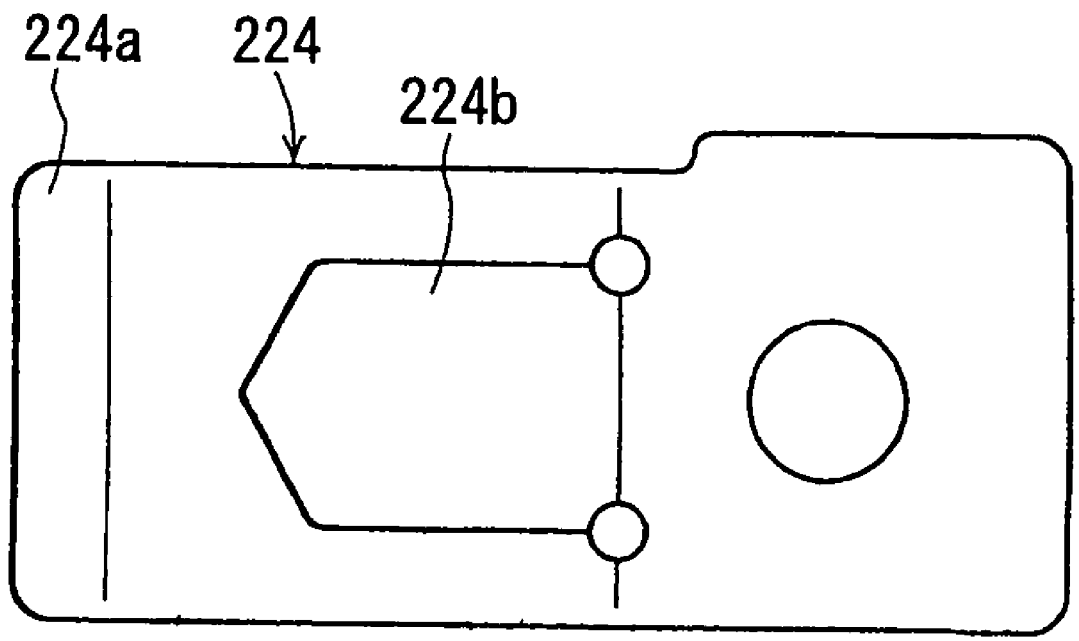
FIGS. 14(a) and 14(b) respectively show a plate spring; specifically.
Figure 14B:
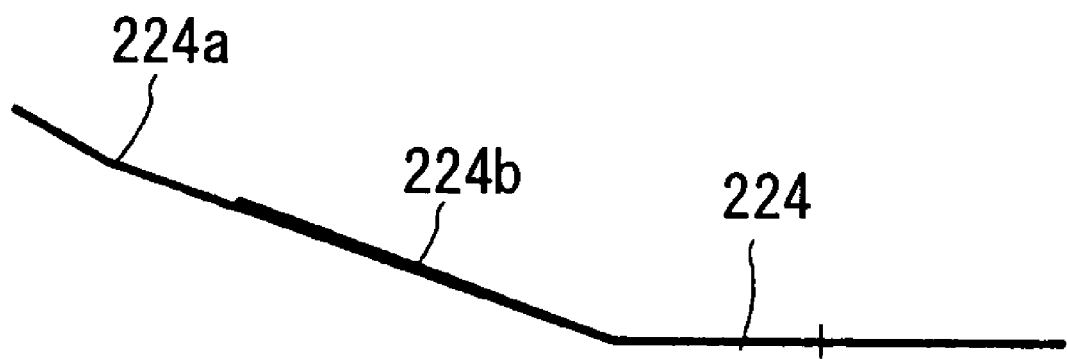
Figure 15:
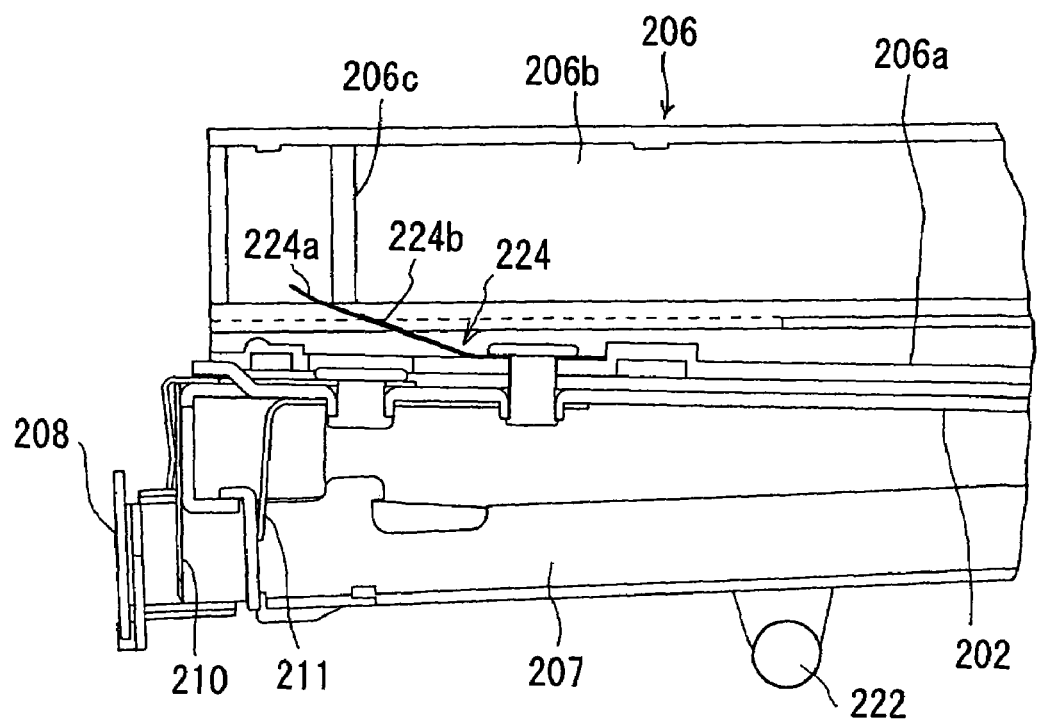
FIG. 15 is a side section view of the front portion of the driver handle.

FIG. 14 shows the plate spring 224, in which a single rectangular plate spring is cut worked in the central portion thereof to form a U-shaped cut to thereby turn the single plate spring into a long spring portion 224a and a short spring portion 224b, and the two long and short spring portions 224a and 224b are formed so as to be able to operate independently of each other. In a state where the upper cover portion 206b of the tape guide 206 is bound as shown in FIG. 13, the downstream side long spring portion 224a is elastically contacted with the rib 206c and the upstream side short spring portion 224b is situated near to the ceiling surface on the fore side of the rib 206c. FIG. 15 shows a state in which the upper cover portion 206b is opened and, in a state in which no stress is applied to the plate spring 224, the long spring portion 224a rises up to an angle equal to the short spring portion 224b to thereby provide a single spring shape.

Figure 16:
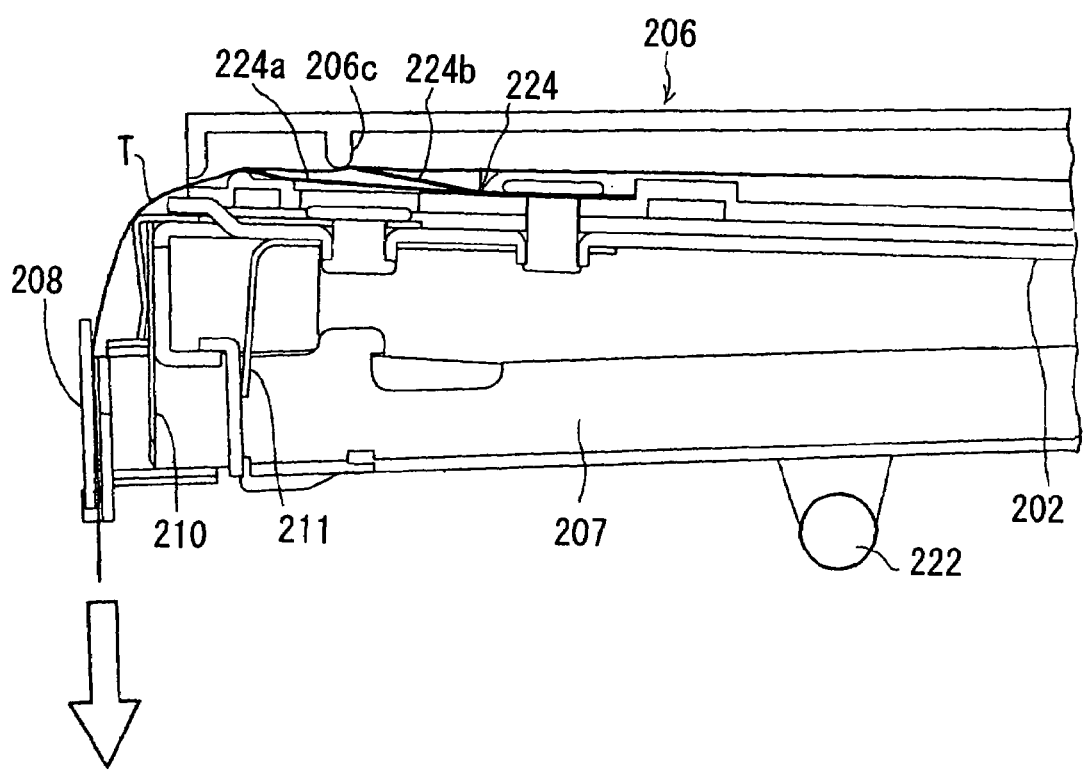
FIG. 16 is a side section view of the front portion of the driver handle.
Figure 17:
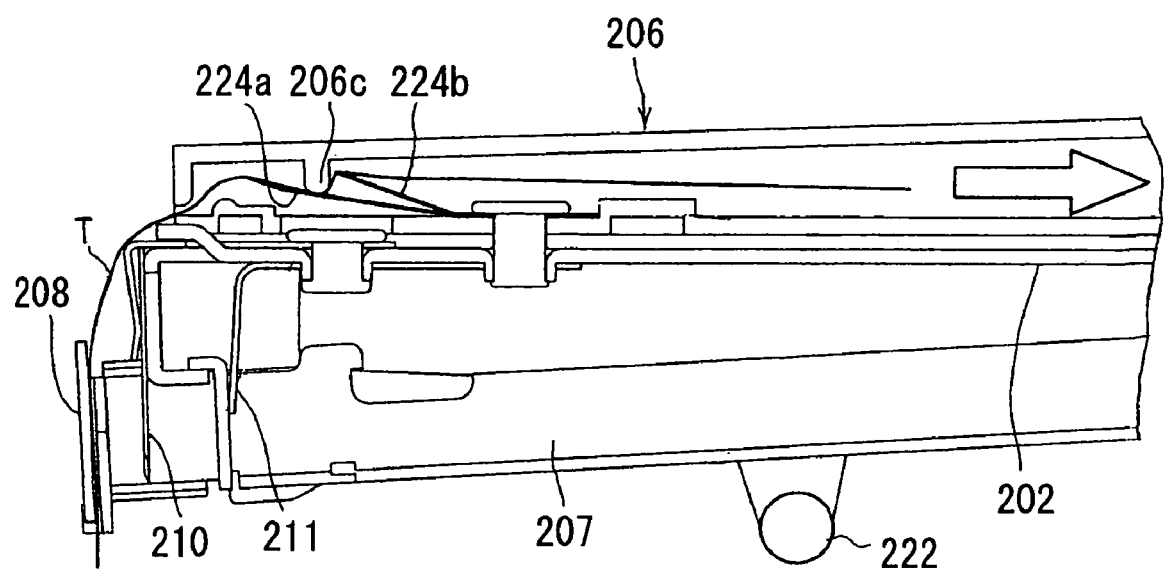
FIG. 17 is a side section view of the front portion of the driver handle.
Figure 18A:
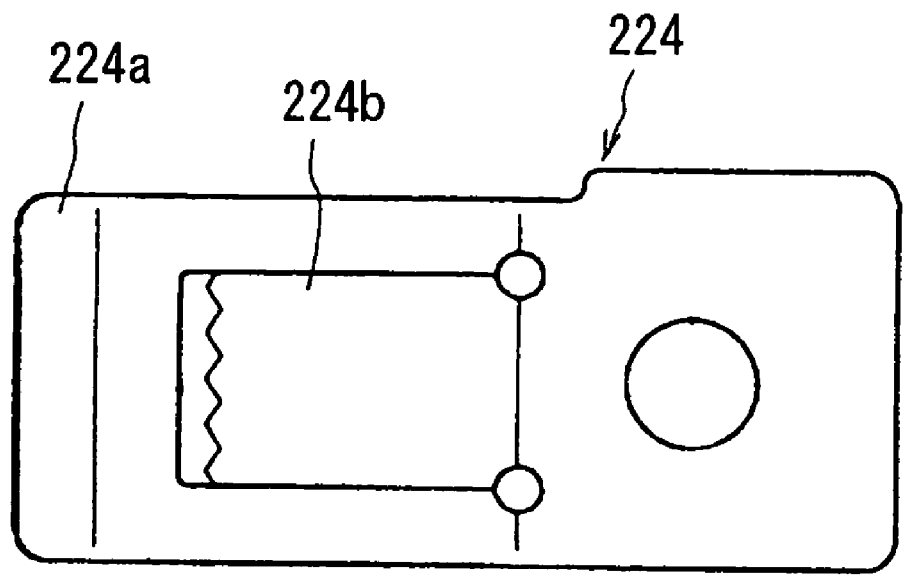
FIGS. 18(a) and 18(b) respectively show a plate spring; specifically.
Figure 18B:
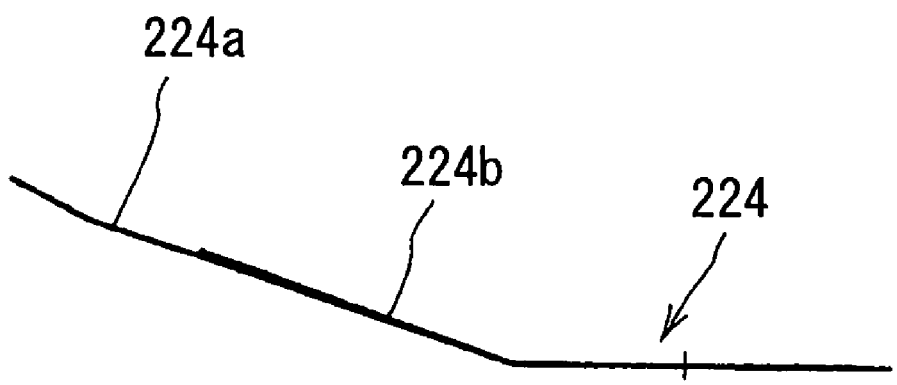
Figure 19A:
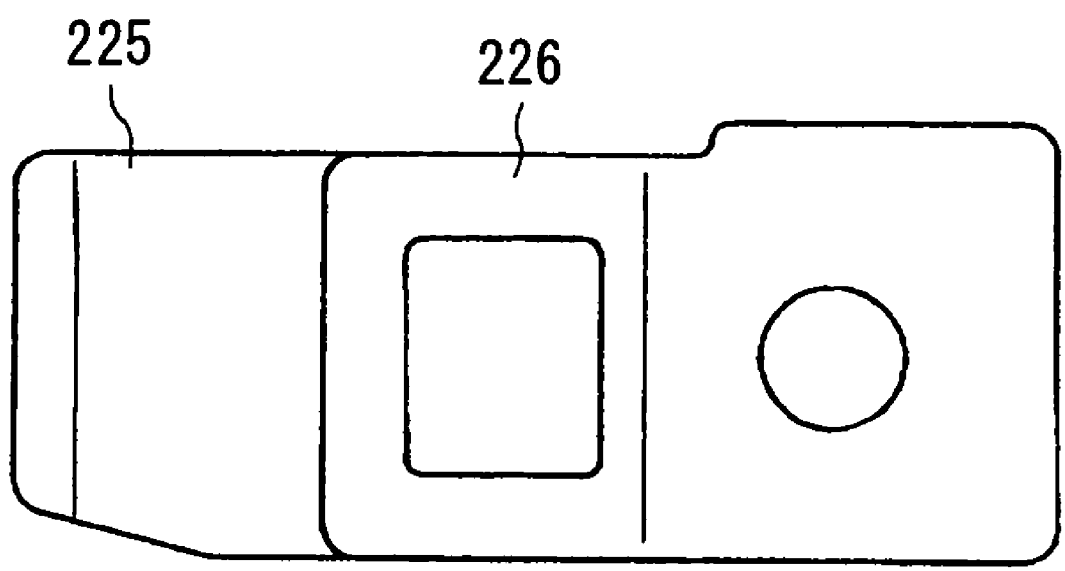
FIGS. 19(a) and 19(b) respectively show a plate spring; specifically.
Figure 19B:
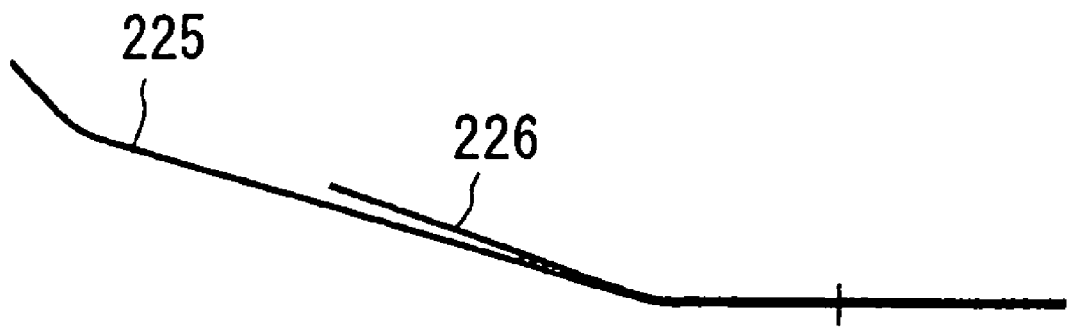
Figure 20:
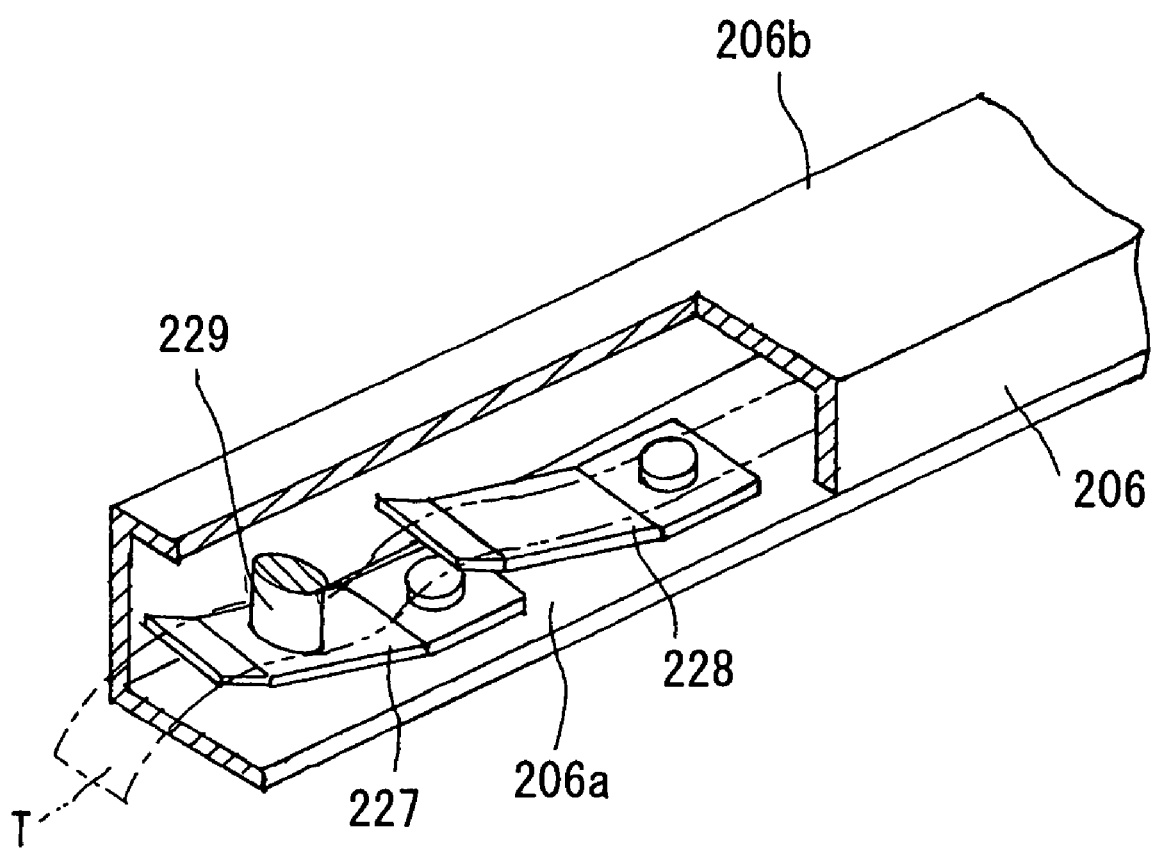
FIG. 20 is a broken view of the front portion of a driver handle.

FIG. 16 shows a state in which the tape T is pulled out in the binding operation. In this state, the long and short spring portions 224a and 224b are pushed down due to the tension of the tape T and the tape T is pulled out almost linearly. FIG. 17 shows a case in which a rotational force in the reversing direction is applied to the tape roll within the tape magazine due to a change in the operating attitude of an operator; and, in this case, since the long spring portion 224a and rib 206c hold the tape T between them, the tape existing between the rib 206c and the tape roll is pulled back, when the short spring portion 224b is pulled up due to the friction of the tape T. Because the tape T curves almost at right angles in the leading end of the short spring portion 224b, the frictional force between the short spring portion 224b and tape T increases as the reversing tension of the tape T becomes stronger and thus the short spring portion 224b bites into the tape T to thereby prevent the tape T from being reversed. Incidentally, in FIG. 14, the leading end portion of the short spring portion 224b has an angular shape but it also may have such a notch-like shape as shown in FIG. 18. However, in a case where the leading end portion of the short spring portion 224b is formed in the angular shape or in the notch-like shape to thereby reduce the contact area with respect to the tape, the contact pressure and friction per unit area increases to thereby be able to enhance the reversing prevention effect of the tape T. Also, instead of cutting a single plate spring to thereby provide two long and short spring portions, there may also be employed a structure composed of two springs; that is, as shown in FIG. 19, two long and short plate springs 225 and 226, which are produced separately, may be superimposed on top of each other. Further, as shown in FIG. 20, two plate springs 227 and 228 may be disposed apart from each other, one on the upstream side and the other on the downstream side. Still further, the projecting portion, with which the downstream side plate spring 227 can be contacted, may be other projecting portion than the above-mentioned rib-shaped projecting portion and, for example, it may be also be such a cylindrical-shaped projecting portion 229 as shown in FIG. 20.

Figure 21:
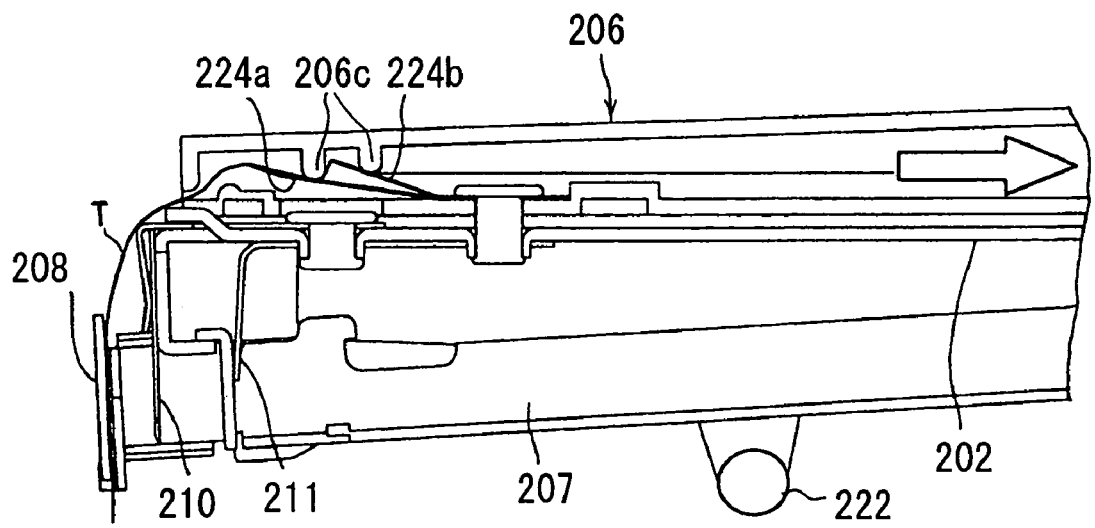
FIG. 21 is a side section view of the front portion of a driver handle used in a binding machine for gardening according to a third embodiment of the invention.

FIG. 21 shows a third embodiment in which two ribs 206c are disposed back and forth in series on the ceiling surface of the front portion of the upper cover portion 206b and long and short spring portions 224a and 224b are respectively elastically contacted with their associated ribs 206c so that the tape is held by and between the two pairs of plate springs and ribs. In the binding operation, similarly to FIG. 16, the long and short spring portions 224a and 224b are pushed down due to the tension of the tape T and thus the tape T is pulled out almost linearly. However, unlike the previously described embodiment in which no pressure is applied to the short spring portions 224b to thereby set it free, the short spring portions 224b is elastically contacted with the rib 206c and, therefore, the initial angle of the short spring portions 224b can be prevented from varying due to variations in the dimensions of springs caused by the producing errors thereof or due to the deformation of the springs caused by the fatigue thereof or by external forces, which makes it possible to stabilize the pull-out resistance of the tape. Also, when the tape roll within the tape magazine is reversely rotated and the tape is thereby pulled backwardly as shown by the arrow mark, the short spring portion 224b is butted against the rib 206c and thus the flexion angle thereof is limited, thereby being able to stabilize the reverse movement preventive effect. At the same time, in a case where the tape is pulled backwardly with a stronger force when the tape roll is replaced, the short spring portion 204b can be prevented from flexing greatly, which makes it possible to prevent the short spring portion 204b from being deformed.

Figure 22:
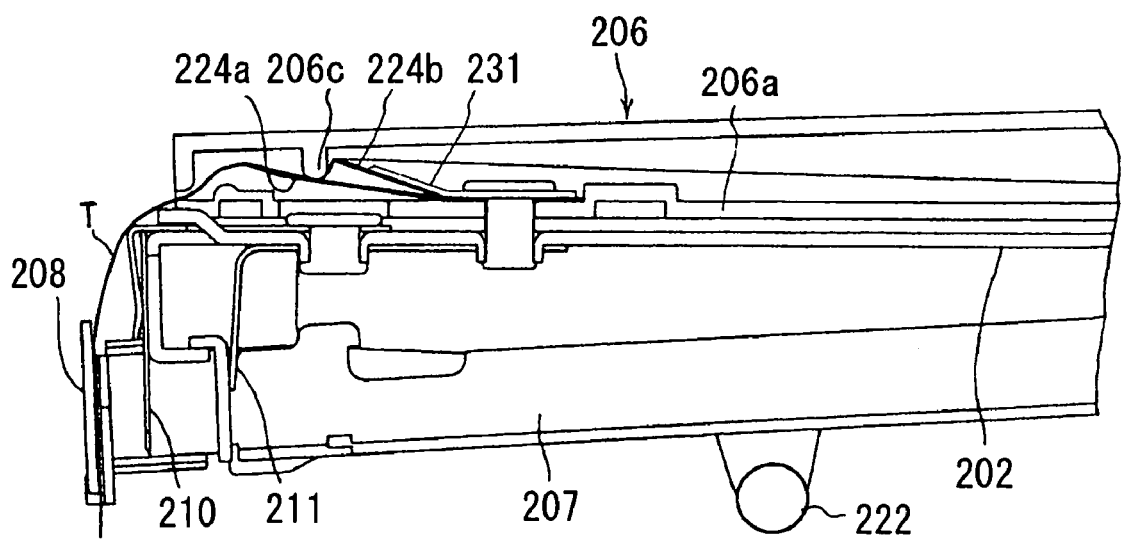
FIG. 22 is a side section view of the front portion of a driver handle used in a binding machine for gardening according to a fourth embodiment of the invention.

FIG. 22 shows a fourth embodiment, in which, in addition to the structure shown in FIG. 13, a stopper 231 made of sheet metal is disposed on the short spring portion 224b. The stopper 231 is superimposed on top of the short spring portion 224b and is mounted on the bottom plate portion 206a of the tape guide 206 to cover the short spring portion 224b from the base portion to the middle portion thereof. Since the stopper 231 limits the flexion angle of the short spring portion 224b, similarly to the embodiment shown in FIG. 21, the tape pull-out resistance and reverse movement preventive effect can be stabilized as well as the deformation of the short spring portion 224b can be prevented.

The invention is not limited to the above-mentioned embodiments but various changes and modifications are possible without departing from the technical range of the invention. Accordingly, it goes without saying that the invention covers these changes and modifications.

The present patent application is based on Japanese Patent Application (Application No. 2001-205373) filed on Jul. 5, 2001, Japanese Patent Application (Application No. 2002-205373) filed on Mar. 20, 2002, and Japanese Patent Application (Application No. 2002-173115) filed on Jun. 13, 2002, while the contents of these applications are incorporated into the present patent application for reference.

INDUSTRIAL APPLICABILITY

As has been described heretofore, a tape guide apparatus in a binding machine for gardening according to the invention is structured such that, when a force to pull back tape to the tape roll side is applied to the tape, a plate spring can hold the tape to thereby prevent the tape from being moved reversely. Thanks to this, there is eliminated a possibility that the tape roll within a tape magazine can be rotated reversely due to vibrations and the leading end of the tape can be thereby pulled back, which can eliminate a fear for failure of binding.

The invention claimed is:

1. A tape guide apparatus in a binding machine for gardening, comprising:
   a driver handle;
   a tape magazine storing tape and disposed on said driver handle;
   a tape guide mounted on said driver handle for forming a cylindrical tape passage upwardly of said driver handle;
   a clincher arm disposed in combination with said driver handle;
   a first projecting portion formed on an inner wall surface of said tape passage;
   a first plate spring disposed on the inner wall surface of said tape passage opposed to said first projecting portion, having a leading end thereof directed toward the downstream side of said tape passage, and elastically contactable with said first projecting portion; and
   a second plate spring disposed on the inner wall surface of said tape passage opposed to said first projecting portion, arranged in series with said first plate spring, and having a leading end thereof directed toward the downstream side of said tape passage,
   wherein said tape loaded into said tape magazine is inserted into said tape passage and is pulled out from the leading end portion of said tape guide, and
   wherein said tape is held by and between said first plate spring and said first projecting portion, and said second plate spring is contacted with said tape.

2. The tape guide apparatus in a binding machine for gardening as set forth in claim 1, further comprising:
   a fixing stopper mounted so as to extend from a base portion to a middle portion of said second plate spring for restricting an oscillation angle of said second plate spring.

3. The tape guide apparatus in a binding machine for gardening as set forth in claim 1, further comprising:
   a second projecting portion formed on the inner wall surface of said tape guide and arranged in series with said first projecting portion,
   wherein said second plate spring can be elastically contacted with said second projecting portion, and
   wherein said tape is held by and between said second plate spring and said second projecting portion.

4. The tape guide apparatus in a binding machine for gardening as set forth in claim 1, wherein said first plate spring and said second plate spring are an integrated plate spring of two long and short plate springs produced by working a U-shaped cut in a single plate spring.

5. The tape guide apparatus in a binding machine for gardening as set forth in claim 1, wherein a tip end of said second plate spring is formed so as to have an angular shape or a notch-like shape.

* * * * *